May 8, 1928.
M. J. HUGGINS
1,668,770
BOURDON PRESSURE GAUGE
Filed Dec. 26, 1925
2 Sheets-Sheet 1
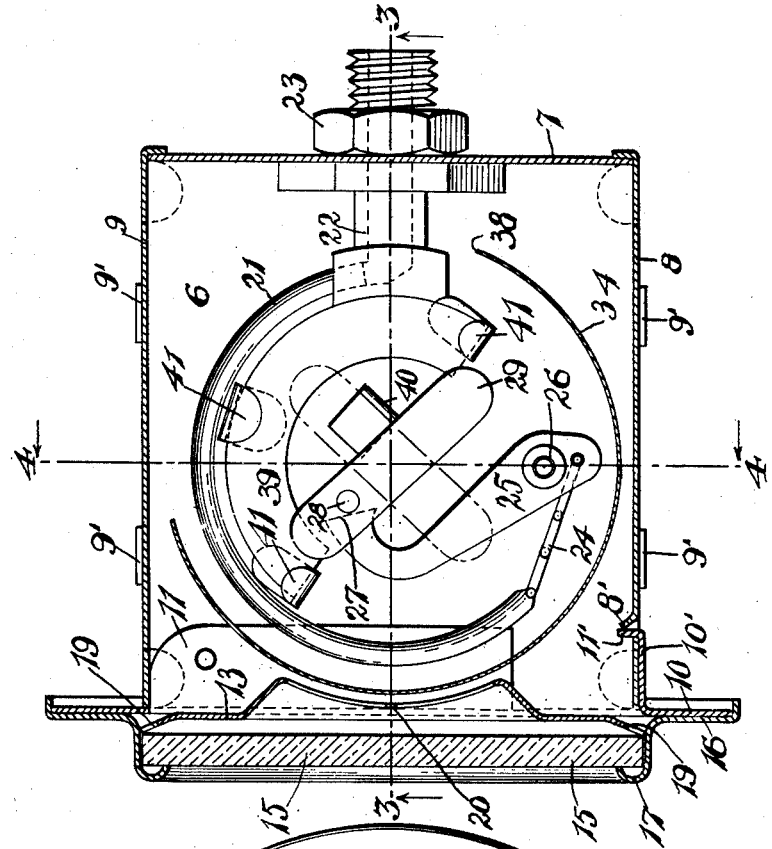
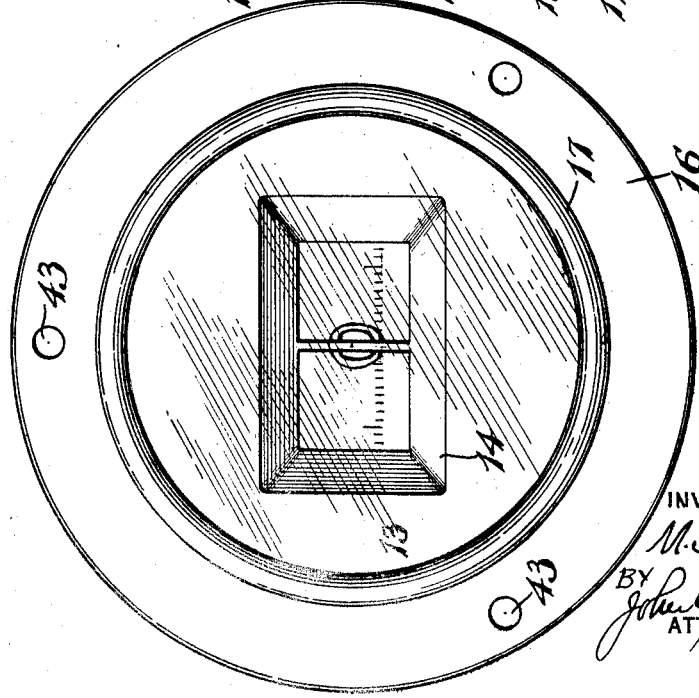
INVENTOR
M. J. Huggins
BY
ATTORNEY May 8, 1928.

M. J. HUGGINS 1,668,770

BOURDON PRESSURE GAUGE

Filed Dec. 26, 1925

INVENTOR
M. J. Huggins
By
John O. Seifert
ATTORNEY

Patented May 8, 1928.

1,668,770

UNITED STATES PATENT OFFICE.

MERION J. HUGGINS, OF UPPER SADDLE RIVER, NEW JERSEY, ASSIGNOR TO AUTO-METER CO., INC., OF NEW YORK, N. Y., A CORPORATION OF DELAWARE.

BOURDON PRESSURE GAUGE.

Application filed December 26, 1925. Serial No. 77,831.

This invention relates to pressure gauges utilizing a pressure sensitive or responsive element, such as a Bourdon tube, arranged for connection with a source of pressure, the variations of which is to be indicated and where variations in such pressure produce variable expansible movements of the pressure sensitive element, said element having an operative connection with an indicator dial to transmit the movement of said element to and proportionally move the indicator. In the structure of some pressure gauges of this character, so far as applicant is aware, the pressure sensitive element operates not only to transmit the expansive movement thereof to the indicator and thus indicate increases in pressure, but also has the load of the indicator imposed upon the inherent tension thereof to impart return movement to the indicator when the pressure falls and thus not only retarding the contractile movement of said element but also impairing the resiliency thereof in time. In other structures return movement is imparted to the pressure sensitive element to normally urge the same to a predetermined position by a spring and against the influence of which spring the indicator is moved by the pressure sensitive element.

It is the object of the present invention to provide an improved constructed and arranged pressure gauge of this character wherein the indicator is moved through the expansible movements of the pressure sensitive element induced by variations in the pressure from the source against the forces of a magnet upon an element to serve as armature thereto associated with the indicator, and whereby the return movement is imparted to the indicator to move and retain it in initial or zero position through the magnetic influence of said magnet on the armature element associated with the indicator.

In the drawings accompanying and forming a part of this specification Figure 1 is a front elevation of a carrying casing for my improved pressure gauge and exposing an indicator dial through an opening therein.

Figure 2 is a longitudinal sectional view taken substantially centrally through Fig. 1 and showing the arrangement and mounting of the gauge mechanism in the casing.

Figure 4:
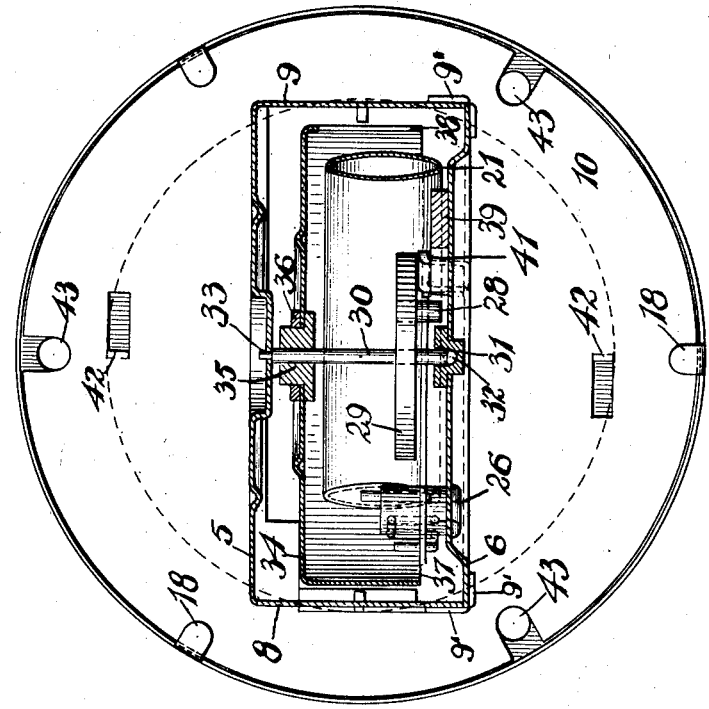
Figure 4 is a cross sectional view taken on the line 4—4 of Figure 2 looking in the direction of the arrows.

In the embodiment of the invention illustrated in the drawings the operative mechanism of the gauge is mounted in a casing, comprising opposite side wall plates 5 and 6, the plate 6 having greater length than the other plate. The extended portion of plate 6 is bent at a right angle to the body portion to form an end wall 7 of the casing. The plate 5 has greater width than the wall 6 and equal extending portions are flanged laterally to form enclosing walls 8 and 9 of the casing. The wall plates 5, 6 are secured together to form the casing by providing clips 9' at the marginal portions of one casing plate and engaging said clips in recesses in the edge portions of the other casing plate and bending them in lapped relation to such plate. The end of the casing opposite to the flange 7 of plate 6 is open. A mounting plate 10 shown of circular form has a central opening corresponding to the open end of the casing; the material stamped from the plate to form the opening being flanged laterally, as at 11, for engagement in the open end of the casing for mounting the latter thereon. A portion of the material stamped from the plate 10 to form the opening is flanged laterally, as shown at 10', to engage at the outer side of the flange 8 of casing plate 5, and is arranged with a lip 11' to engage in an opening in said flange 8 and with a lip 8' formed of the material stamped from the plate flange to form the opening and bent into the casing, as shown in Figure 4. To mount the casing upon the mounting plate 10 the casing is canted to engage the lip 11' into the opening formed by the lip 8' when the casing is adjusted so that the plate flanges 11 engage within the casing when a cotter pin 12 is engaged in registering openings in the casing plates 5, 6 and plate flanges 11. To remove the casing it is only necessary to remove the cotter pin, swing the casing on the flange 10' of the mounting plate and unhook it from the lip 11'.

Figure 3:
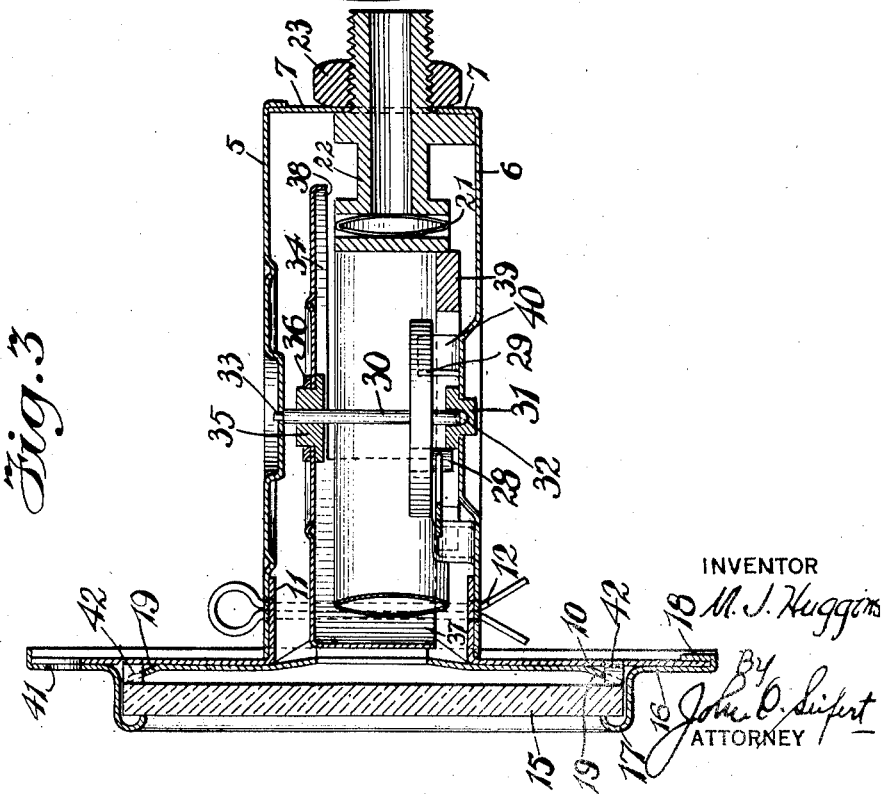
Figure 3 is a cross sectional view taken on the line 3—3 of Figure 2 looking in the direction of the arrows.

A dial face 13 is mounted contiguous to the plate 10, said dial having a smaller opening in a depressed portion with the marginal wall portions of the opening sloping inwardly, as shown at 14, to facilitate the reading of the gauge. A sheet of transparent material 15, such as glass, is positioned contiguous to the dial face by a ring 16 of angular shape in cross section having an inwardly curled flange 17 positioned over the surface of the glass and the other edge of the ring flanged about the periphery of the plate 10 and arranged with lips or tongues to be bent about the plate 10, as at 18, (Figures 3 and 4), to combine the plates 10, 13 and 15 into a unitary structure. To provide a resilient support for the glass 15 portions are stamped from the periphery of the dial 13 and bent upwardly to form lips with which the glass 15 engages, as at 19. The dial plate is substantially of the same diameter as the glass and said lips 19 engage with an angular wall portion of the ring 16 and serve to position the dial plate with a bar 20 extending transversely of the opening in the depressed portion thereof centrally of the casing.

A pressure sensitive or responsive element shown in the form of a circularly arranged Bourdon tube 21 is mounted at one end in a member 22 in communication with a bore therein whereby said element is mounted in the casing by engaging said member in a perforation in the wall 7 and secured therein by a nut 23 threaded onto the part of the tube mounting member extended through the perforation at the outside of the casing, said end also being adapted to receive a pressure supply pipe from a source of pressure. The other end of the tube 21 is flexibly connected by a chain 24 to one end of a lever 25, the opposite end of which lever is of hook shape and pivotally mounted adjacent the end to which the tube 21 is connected on a post 26 mounted on the casing plate 6. The hook end of the lever has a straight edge, as shown at 27, for sliding engagement and operative connection with a pin 28 fixed in and extending laterally from a bar 29. This bar is mounted intermediate its ends on a spindle 30 with the pin 28 at one side of said pivotal support. The spindle is rotatably mounted at both ends in the casing, at one end in a bearing member 31 mounted in a perforation in the casing plate 6 by an antifriction bearing, such as a ball bearing 32. The other end is reduced and engaged in a perforation in casing plate 5, as at 33. It will thus be obvious that as the sensitive element 21 is expanded that such movement will be transmitted through its flexible connection 24 to the lever and from the lever to the bar 29. The movement of the bar is transmitted to an indicator dial or drum in the form of a cupped member 34 fixed by a collar 35 on the spindle to rotate therewith. The drum is secured on the collar 35 by a clamping member 36 engaged on a reduced end of the collar extending through the drum. The flange or wall of the drum for approximately one-half the circumference is cut away, as at 38, to permit of free rotative movement of the drum without interference by the supporting member 22 for the tube 21. Calibrations indicative of pressure are arranged on the periphery of the drum flange, and the drum is mounted in the casing with the drum flange in contiguous relation to the depressed portion of plate 13 which is curved to conform to the curvature of the periphery of the drum to expose the drum calibrations through the opening in said plate depression.

Through the expansible movement of the tube 21 from internal pressures and the connection between said tube and the bar 29 the indicator drum is rotated a distance which is proportional to the expansible movement of the pressure sensitive element.

The movement of the bar 29 through the expansible movement of the tube 21 is limited by the end of the bar 29 in which the pin 28 is arranged engaging with a stop 40, as shown in dot and dash lines in Figure 2, said stop being in the form of a lug stamped from and bent at right angles to the casing plate 6.

The bar 29 serves as armature to a magnet 39, for which purpose it is made of magnetizable material and preferably polarized, the magnet being of semi-circular form and mounted within the casing upon the casing plate 6 by stamping portions from said plate and bending them over the ends of the magnet and over a portion intermediate the ends thereof, as shown at 41. The magnet and bar 29 are so positioned relative to each other that the bar is arranged in the magnetic lines of force or flux passing between the poles of the magnet and exerting a force on the bar to urge it in a direction reverse to that in which it is moved by the expansible movements of the tube 21. This attractive force of the magnet upon the bar also maintains the bar pin 28 in operative relation to the face 27 of the lever 26. The attraction of the magnet on the bar when the tube 21 is fully contracted urges the bar 29 to position to engage the portion at the side of its support opposite to the pin 28 with the edge of the lug 40 to limit the movement of the bar in said direction and the connected drum in position with the zero indice of the dial calibrations in line with the bar 20 extending transversely of the opening or window in the depression of plate 13. This magnetic force of the magnet on the bar also serves to maintain the bar firmly in engagement with the stop 40 and prevents any chattering or vibration of the dial when the gauge is used in connection with motor vehicles for which purpose the gauge has been particularly designed.

To provide a further resilient seat for the transparent plate of glass 15 yielding supports are arranged between the plate 10 and the glass 15 in the form of lugs 42 stamped from plate 10 and bent laterally to extend through openings in the plate 13 into engagement with the glass. These lugs 42 and the lugs 19 of plate 13 firmly though yieldingly holding the glass against the curled flange 17 of the securing ring and prevent chattering of the glass.

To secure the gauge upon a mounting member, such as the instrument board of a motor vehicle, the mounting ring 16 is arranged with circumferentially spaced perforations 43 registering with recesses in the periphery of the mounting plate 10. The instrument is engaged in an opening in said instrument board with the marginal portion of the mounting member extending beyond the edge of said opening and is secured therein by screws engaged in said perforations 43.

Having thus described my invention I claim:

1. In a pressure gauge, a pivotally supported indicator, a bar of magnetized material connected to the indicator, a pressure sensitive element arranged for connection with a pressure supply and having a flexible connection with the bar for moving the bar and indicator in one direction distances proportional with the movement imparted to said element by variations in the pressure supply, and a circular magnet for counteracting the force of the pressure sensitive element on the bar to position the bar with the indicator in zero position.

2. In a pressure gauge, an indicator, a rotatable spindle on which the indicator is mounted, a bar of magnetized material mounted intermediate its ends on the indicator carrying spindle, a pressure sensitive element arranged for connection to a source of pressure and having an operative connection with the polarized bar to transmit the movement of said element to rotative movement of the bar and indicator in one direction, a magnet for influencing and counterbalancing the force of the pressure sensitive element on the polarized bar and to urge the bar in a direction to move the indicator to zero position when not acted upon by the pressure sensitive element.

3. In a pressure gauge, a dial indicator, a rotatable spindle supporting said indicator, a bar of magnetized material mounted intermediate its ends on the spindle and thereby connected to the indicator, a pressure sensitve element having a flexible connection with the bar to transmit the movement of said element to the indicator to indicate pressure, magnetic means for moving the bar and the dial in reverse direction to zero position, and a stop for engagement by the bar to limit the movements of the bar and thereby the indicator by the pressure element and the magnetic means.

4. In a pressure gauge, an indicator, a rotatable spindle supporting the indicator, a bar of magnetized material connected to the indicator by the spindle, a pressure sensitive element arranged for connection to a pressure supply, a lever having an operative connection with the bar, flexible connection means between said lever and the pressure sensitive element, a magnet for influencing the bar to urge and move the indicator to zero position, and a stop for engagement by the bar for limiting the movements of the bar and indicator imparted thereto by the pressure element and by the magnet.

5. In a pressure gauge, a pivotally supported indicator, a bar of magnetized material fixed to the indicator support, a pressure sensitive element, a pivotally supported lever having an operative connection with the bar and pressure sensitive element to transmit the movement of said element to rotative movement of the bar and indicator, and a magnet for influencing and moving the bar and indicator in reverse direction for the purpose specified.

6. In a pressure gauge, a pivotally supported annular dial, a bar of magnetized material connected to the dial to rotate therewith, a pressure sensitive element, a pivotally supported level having an operative connection at one end with the bar, flexible means connecting the opposite end of the lever to the pressure sensitive element for imparting the movement of said element to the bar and dial, and a permanent magnet to influence and move the bar and dial in reverse direction.

7. In a pressure gauge, a pivotally supported drum having calibrations indicative of pressure arranged on the periphery, a magnetized bar connected to the drum support to rotate therewith, a pressure sensitive element arranged within the drum and for connection to a source of pressure, a pivotally supported lever having a friction contact surface at one end for engagement with a fixed part of the bar and a pivoted connection with the pressure sensitive element for transmitting the movement of said element to the bar, and a fixed magnet influencing the bar to urge the bar into engagement with the contact surface of the lever and the drum to zero position.

8. In a pressure gauge, a pivotally supported drum having indices on its periphery indicative of pressure, a bar of magnetized material connected to the drum, a Bourdon tube arranged within the drum and at one end for connection to a source of pressure, a pin fixed in and extending laterally from the bar, a pivotally supported lever having a friction contact surface at one end for engagement with the bar pin and a flexible connection with the free end of the Bourdon tube for transmitting the movement of said tube to the bar in one direcion, and magnetic means for resisting the movement of the bar by the tube and move the indicator drum to zero position with no pressure exerted upon the Bourdon tube.

9. In a pressure gauge, a casing having one end open, a mounting member for engagement of the casing at the open end thereon arranged with a dial plate having a sight opening therein in line with and centrally of the opening in the casing, a drum rotatably mounted in the casing having calibrations indicative of pressure on the periphery for observation through the sight opening in the dial of the mounting member, a magnetized bar to rotate with the drum, a Bourdon tube arranged with means for mounting in the casing and for connecting the same with a source of pressure exterior of the casing, a lever pivotally supported in the casing having operative connection with the Bourdon tube, and a magnet mounted in the casing for influencing the bar to resist the movement of the drum by the Bourdon tube and urge the drum to zero position.

10. In a pressure gauge, a casing comprising a pair of plates, one plate arranged with a flange to constitute an end wall of the casing and the other plate arranged with opposite flanges to constitute opposite side walls of the casing, said plates being adapted to be connected to provide an open end casing, a Bourdon tube, means to mount said tube in the end flange of the one plate and for connecting the tube to a source of pressure, a lever pivoted on said plate having an operative connection with the Bourdon tube to transmit the movement of the latter to said lever, and said lever having a friction face at the opposite end, a magnet mounted on said plate, a circular cup member arranged with pressure calibrations, a spindle on which the cup member is fixed rotatably mounted at opposite ends in the casing plates with the cup member extending about the Bourdon tube, a magnetized bar to serve as armature to the magnet fixed intermediate its ends upon said spindle and under the influence of the magnet normally positioned with the cup member in predetermined position, said bar having a part for engagement by the friction face of the lever to transmit the movement imparted to the lever by the Bourdon tube to the bar and drum against the force exerted on said bar by the magnet.

11. In a pressure gauge as claimed in claim 10, a mounting member for the releasable engagement of the casing at the open end, said mounting member being arranged with a sight opening for observing the calibrations on the cup member.

Signed at the city of New York, in the county of New York and State of New York this 27th day of November 1925.

MERION J. HUGGINS.